US005550978A

United States Patent [19]
Takahashi et al.

[11] Patent Number: 5,550,978
[45] Date of Patent: Aug. 27, 1996

[54] MULTIPROCESSOR SYSTEM HAVING SWITCHES FOR ROUTING CELLS IN PARALLEL AMONG PROCESSORS BY SPLITTING DATA INTO BLOCKS HAVING NUMBERS OF CELLS EQUALS TO PROCCESSOR BUS WIDTH

[75] Inventors: Yasuhiro Takahashi, Fujisawa; Tohru Hoshi, Yokohama, both of Japan

[73] Assignee: Hitachi, Ltd., Tokyo, Japan

[21] Appl. No.: 117,325

[22] Filed: Sep. 7, 1993

[30] Foreign Application Priority Data

Sep. 7, 1992 [JP] Japan .................... 4-237975

[51] Int. Cl.⁶ .................................. G06F 13/00
[52] U.S. Cl. ..................... 395/200.01; 370/94.1; 364/222.2; 364/229.5; 364/242.96; 364/DIG. 1
[58] Field of Search ............... 395/200, 200.01, 395/200.02, 200.13; 370/60, 60.1, 94.1, 94.2

[56] References Cited

U.S. PATENT DOCUMENTS

| | | | |
|---|---|---|---|
| 5,144,619 | 9/1992 | Munter | 370/60.1 |
| 5,166,926 | 11/1992 | Cisneros et al. | 370/60 |
| 5,260,934 | 11/1993 | Tanaka et al. | 370/60 |
| 5,274,768 | 12/1993 | Traw et al. | 370/94.1 |
| 5,287,358 | 2/1994 | Nakayama | 370/94.1 |
| 5,303,232 | 4/1994 | Proctor et al. | 370/60 |
| 5,365,519 | 11/1994 | Kozuki et al. | 370/60 |
| 5,379,297 | 1/1995 | Glover et al. | 370/60.1 |
| 5,414,703 | 5/1995 | Sakame et al. | 370/60 |

FOREIGN PATENT DOCUMENTS

| | | |
|---|---|---|
| 0486167 | 5/1992 | European Pat. Off. . |
| PCT/US88/ 01184 | 4/1988 | WIPO . |
| PCT/JP88/ 00113 | 5/1988 | WIPO . |
| PCT/US92/ 04396 | 5/1992 | WIPO . |

*Primary Examiner*—Thomas C. Lee
*Assistant Examiner*—Moustafa Mohamed Meky
*Attorney, Agent, or Firm*—Antonelli, Terry, Stout & Kraus

[57] ABSTRACT

In a multiprocessor system including a plurality of processors and asynchronous transfer mode (ATM) switches in the number corresponding to a bit width of internal buses of respective processors each processor has an interface for connecting in parallel to each of the plurality of ATM switches. Each interface splits a transmission data block into a plurality of bit data blocks at every bit position, converts them into a plurality of cells by adding a header including routing information determined by a destination processor to each bit data block, and sends these cells in parallel to the plurality of ATM switches. The plurality of cells are transferred in parallel to the destination processors by the ATM switches and reassembled into an original data block in the interface of the destination processor.

7 Claims, 13 Drawing Sheets

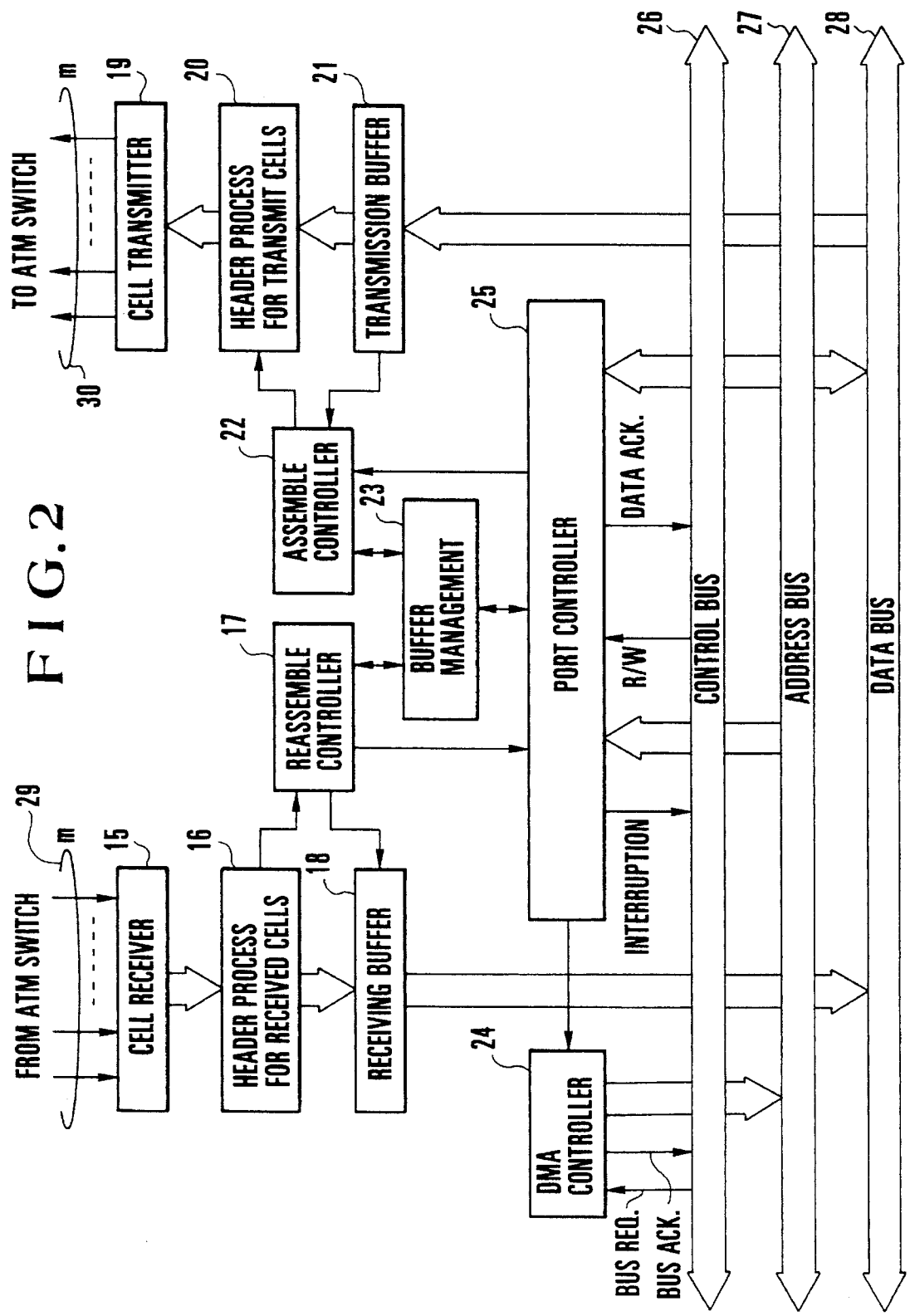

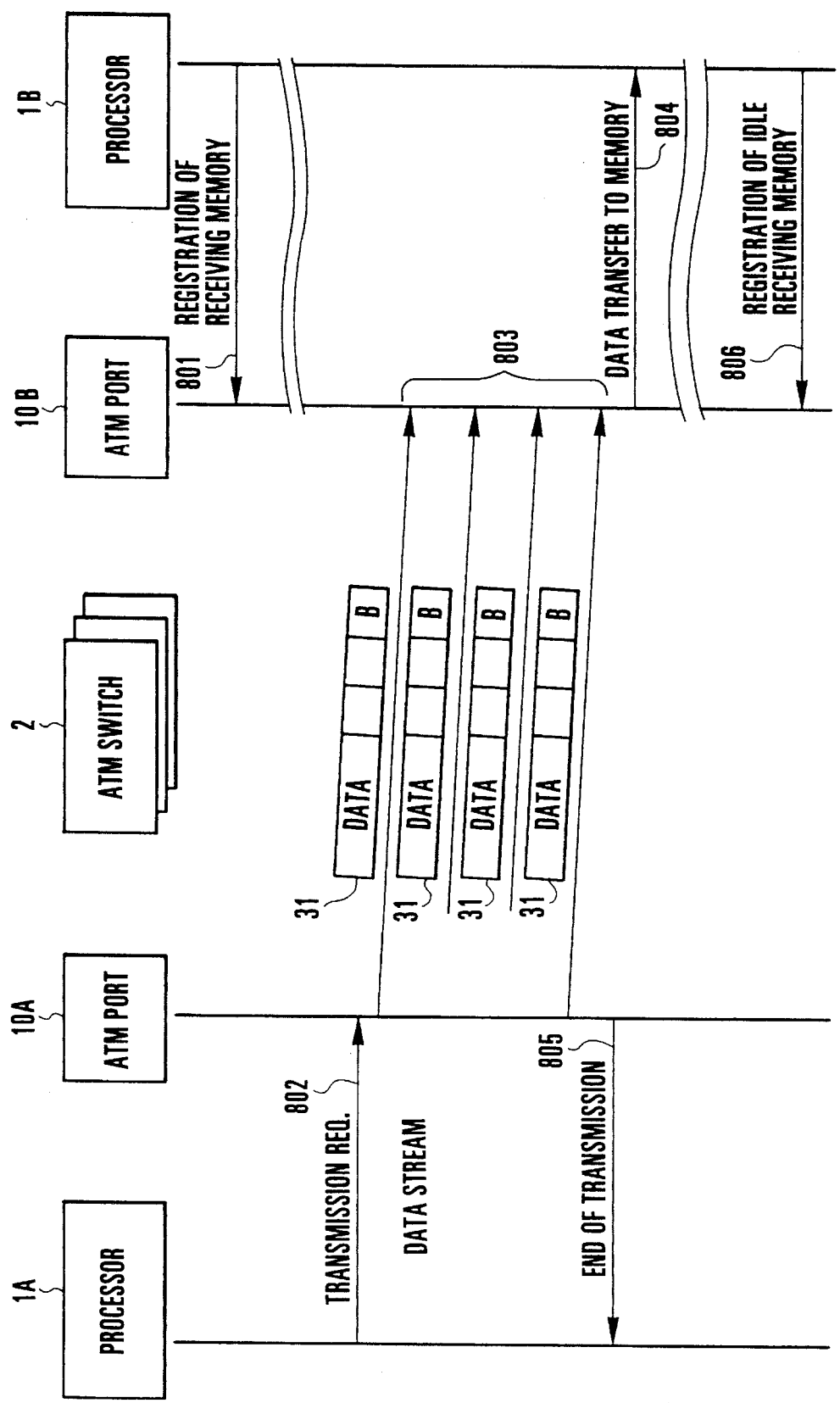

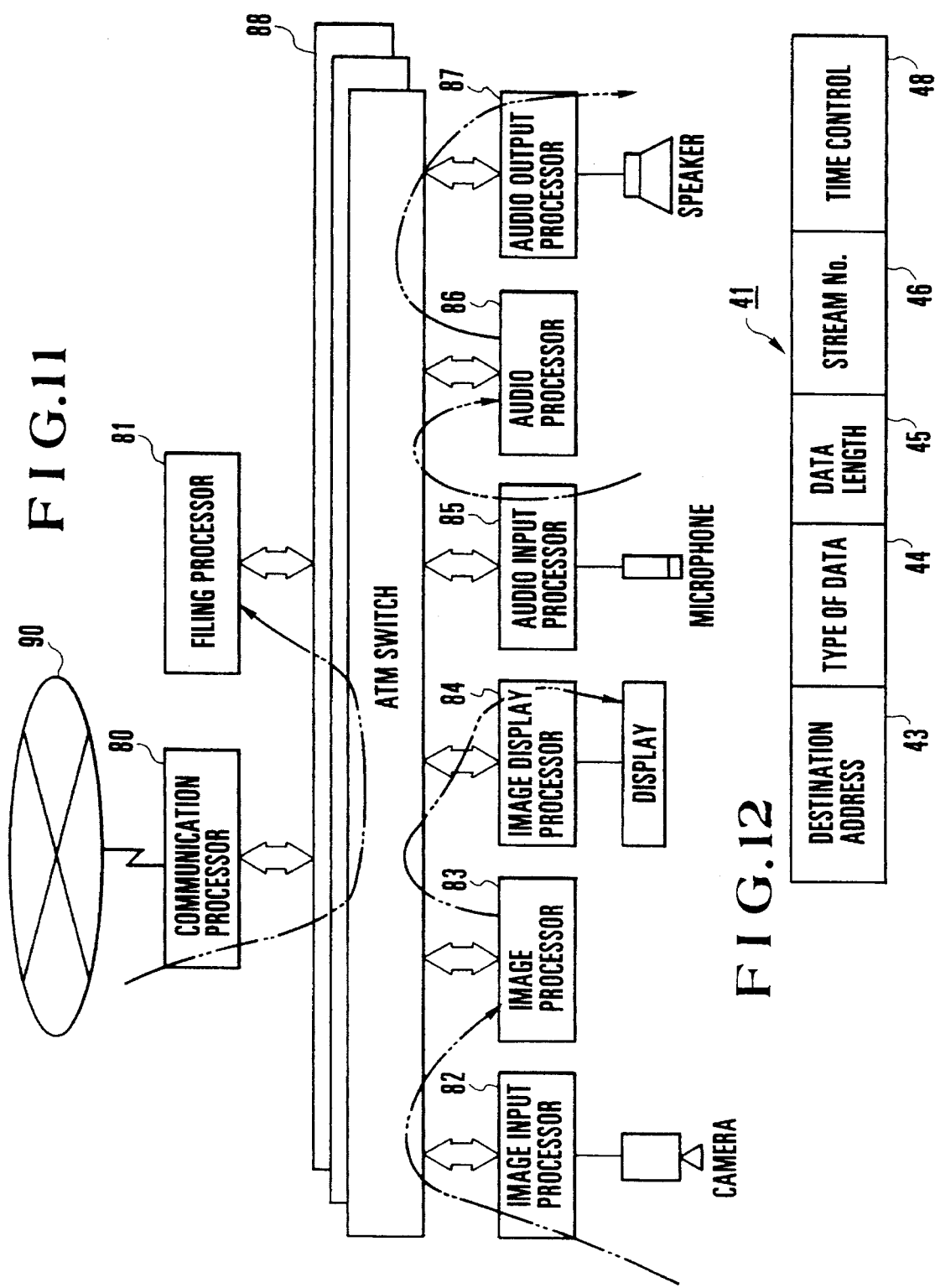

F I G.13
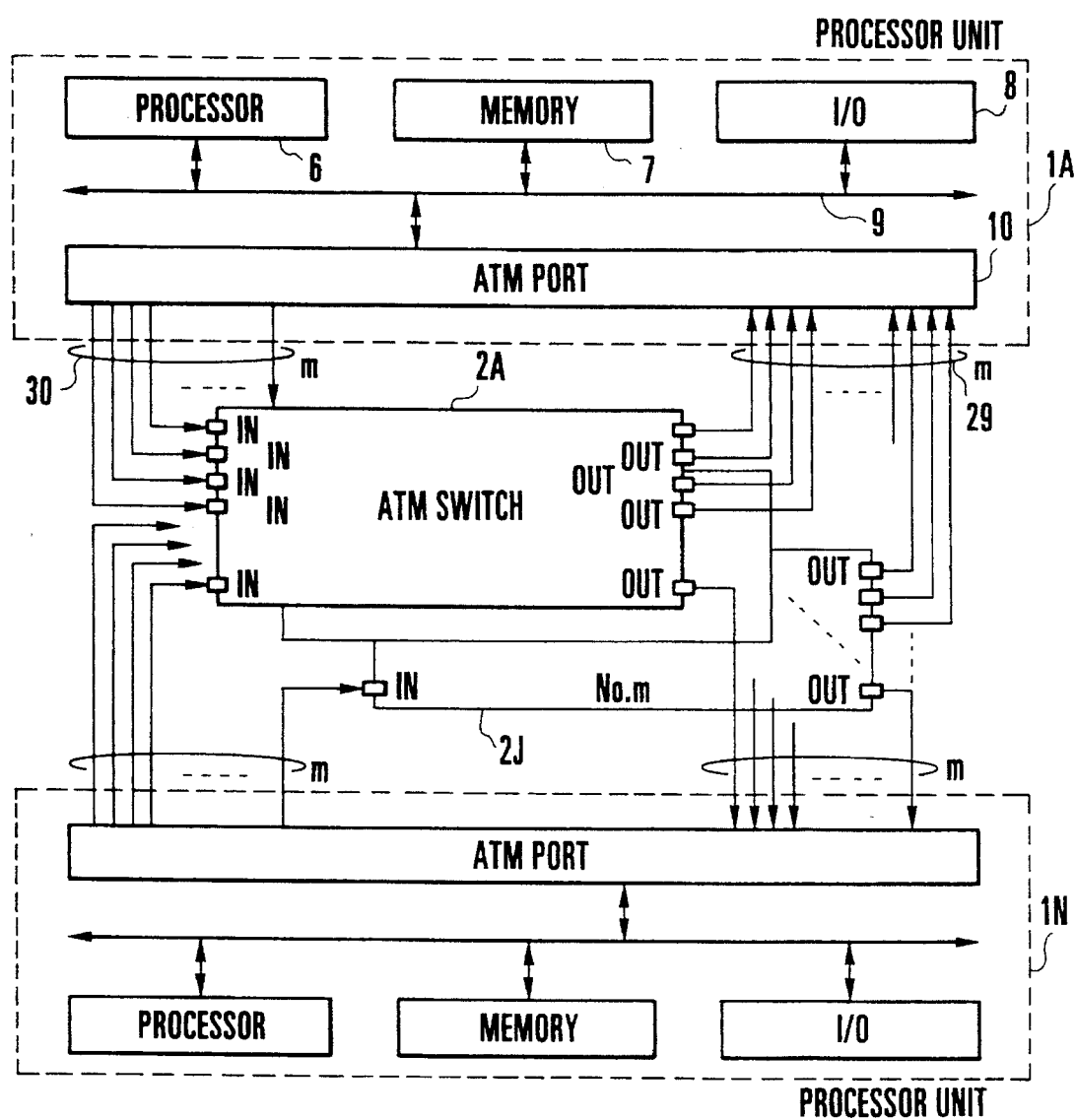

MULTIPROCESSOR SYSTEM HAVING SWITCHES FOR ROUTING CELLS IN PARALLEL AMONG PROCESSORS BY SPLITTING DATA INTO BLOCKS HAVING NUMBERS OF CELLS EQUALS TO PROCCESSOR BUS WIDTH

BACKGROUND OF THE INVENTION

1. Field of the Invention

The present invention relates to a multi-processor system composed of a plurality of processors and a method of communication among processors, and more particularly to a multiprocessor system and a method of communication among processors suitable for a terminal system handling multi-media.

2. Description of the Related Art

Conventionally, in a system for processing images or the like, it has been aimed at to make processing high in speed by using a plurality of exclusive processors instead of performing all image processings in one processor. This is evident, for example, from Japanese literature "Video Information (1)" 1987/12 pp. 23 to 27 "Up-to-Date Image Processing Work Station VICOM-VME Series" for instance. In this case, transmission and reception of data among exclusive processors are performed through an exclusive bus provided separately from a general system bus, and, a method of preventing degradation caused by data traffic other than image processing has been adopted.

In the example described in the abovementioned literature, it is aimed at to make data transfer high in speed by preparing a plurality of processors exclusive for image processing and using a bus IMAGE-BUS exclusive for image processing data which is different from a system bus VME-BUS for communication among these exclusive processors.

The above-mentioned related art has had problems mentioned below since the communication channel exclusive for image processing is in the form of a bus.

Namely, it is required to acquire the right of using a bus in order to commence communication among processors, and, while another processor is performing data transfer, commencement of communication has to be kept waiting until data transfer is ended. Thus, in the case where real time performance is required, e.g., in the case of multi-media information such as a voice or an image, there has been such a problem that the real time performance of the media becomes no longer be warrantable because of delay in processing due to waiting time until the right of using a bus is acquired.

Further, in the above-mentioned related art, communication only between one set of processors can be performed simultaneously. Therefore, when it is intended to prevent the bus from being occupied by a specific processor, continuous use time of the bus allowed for respective processors has to be restricted, and when a processor is going to send comparatively long data, one transmission data stream is cut in pieces once during transmission. There has been such a problem that isochronism of the information is lost due to a fact that time base control is not being made in restoring processing in the processor on the receiving side.

Furthermore, communication can be performed simultaneously only between one set of processors according to the above-mentioned related art adopting bus connection. Therefore, there has been also a problem that processing operation by means of a plurality of processors such that an image input processor transfers image data inputted from a camera to an image processing processor while a communication processor is transferring data received from a network to a file processor, or the result of processing by the image processing processor is transferred to an image display processor in parallel with those operations cannot be performed in parallel.

SUMMARY OF THE INVENTION

It is an object of the present invention to provide a multiprocessor system capable of realizing communication among plurality pairs of processors in parallel simultaneously.

It is another object of the present invention to provide a multiprocessor system, and a method of communication among processors, in which even a comparatively long data stream can be transmitted rapidly without being affected by data transfer by another processor.

In order to achieve the above-mentioned objects, there is provided a multiprocessor system in which a plurality of processors are connected one to another, comprising:

switch means for transferring a cell received from one of a plurality of input terminals to one of a plurality of output terminals determined by header information of the cell; and interface means provided between an internal bus to which each processor is connected and the switch means;

wherein the interface means includes:

first means for dividing a data stream composed of a plurality of bytes to be transmitted to another processor which is received from the processor into a plurality of data blocks, for converting each data block into a plurality of cells in the number determined by the number of bits per byte of the transmission data each having a header which is different depending on a destination processor, and each including a partial data block forming a part of the data block and for sending the plurality of cells in parallel to the switch means; and second means for receiving a plurality of cells from the switch means in parallel and converting the partial data blocks included in the plurality of cells into one data block.

According to a first aspect of the present invention, the first means splits the data stream to be transmitted to another processor, which is received from the above-mentioned processor, into a plurality of data blocks each having a predetermined length, converts each data block into a plurality of cells each having a header which is different depending on a destination processor and each including a bit data block composed of bit information at specific bit position of the data block, and sends the plurality of cells in parallel to a first group of signal lines connected to a first group of input terminals of the switch means, respectively. The second means then receives a plurality of cells in parallel from a second group of signal lines connected to a first group of output terminals of the switch means, and converts bit data blocks included in the plurality of cells into one data block.

The switch means can be structured so that it is composed of a plurality of self-routing switches, and the first means and the second means described above are connected to the plurality of self-routing switches, respectively.

According to one working mode of the present invention, the switch means is composed of self-routing switches in the number equal to the number of bits of one byte of the transmission data, and the first means splits the data block into a plurality of bit data blocks corresponding to bit positions, forms the cell at each bit data block, and sends each cell to a self-routing switch corresponding to a bit position of each byte of the transmission data.

There is also provided a method of communication performed among a plurality of processors connected one to another through at least one switch means, each processor being connected to a plurality of input lines and output lines of the switch means, the method comprising the steps of:

splitting a data block composed of a plurality of bytes to be transmitted into a plurality of bit data blocks by means of a first processor which becomes a transmitting origin, each bit data block being composed of data at the same bit position of each byte of the data block;

forming a plurality of cells by adding headers including routing information inherent to a second processor which becomes a destination of the data, respectively, to the plurality of bit data blocks by means of the first processor;

transmitting the plurality of cells to a plurality of input lines which connect the first processor and the switch means each other in parallel from the first processor;

transferring the plurality of cells to a plurality of output lines connecting the second processor and the switch means each other in parallel by the switch means; and receiving a plurality of cells in parallel from the plurality of output lines and reassembling bit data blocks included in respective received cells into one data block by the second processor.

According to the present invention, it is possible to secure exclusive communication channels between respective processors and other optional processors by connecting the first and the second signal line groups which connect respective processors and the switch means one another to the input terminals and the output terminals inherent to the processor of the switch means (or a plurality of self-routing switches constituting it), respectively.

Thus, according to the present invention, it becomes possible for each processor to transfer data in parallel simultaneously without waiting for the end of a data transfer operation by another processor.

As a result, when the present invention is applied to multi-media terminals, for instance, it becomes possible to perform communication among a plurality of processors such as transfer operation of the data received from a wide area network to a file, transfer operation of image data to an image processor from an image input processor, transfer operation of the result of processing by the image processor to a display processor, and so on.

The foregoing and other objects, advantages, manner of the operation and novel features of the present invention will be understood from the following description when read in conjunction with the accompanying drawings.

BRIEF DESCRIPTION OF THE DRAWINGS

FIG. 2 is a diagram showing a detailed structure of an Asynchronous Transfer Mode (ATM) port 10 in FIG. 1;

FIG. 10 is a diagram showing an embodiment of transfer steps of procedure suitable for real time data among processors;

FIG. 11 is a diagram showing an example of a multimedia system applied with a multiprocessor construction according to the present invention;

FIG. 12 is a diagram showing an example of a header structure of a data stream;

FIG. 13 is a block diagram showing another embodiment of a multiprocessor system according to the present invention.

DESCRIPTION OF THE PREFERRED EMBODIMENTS

Figure 1:
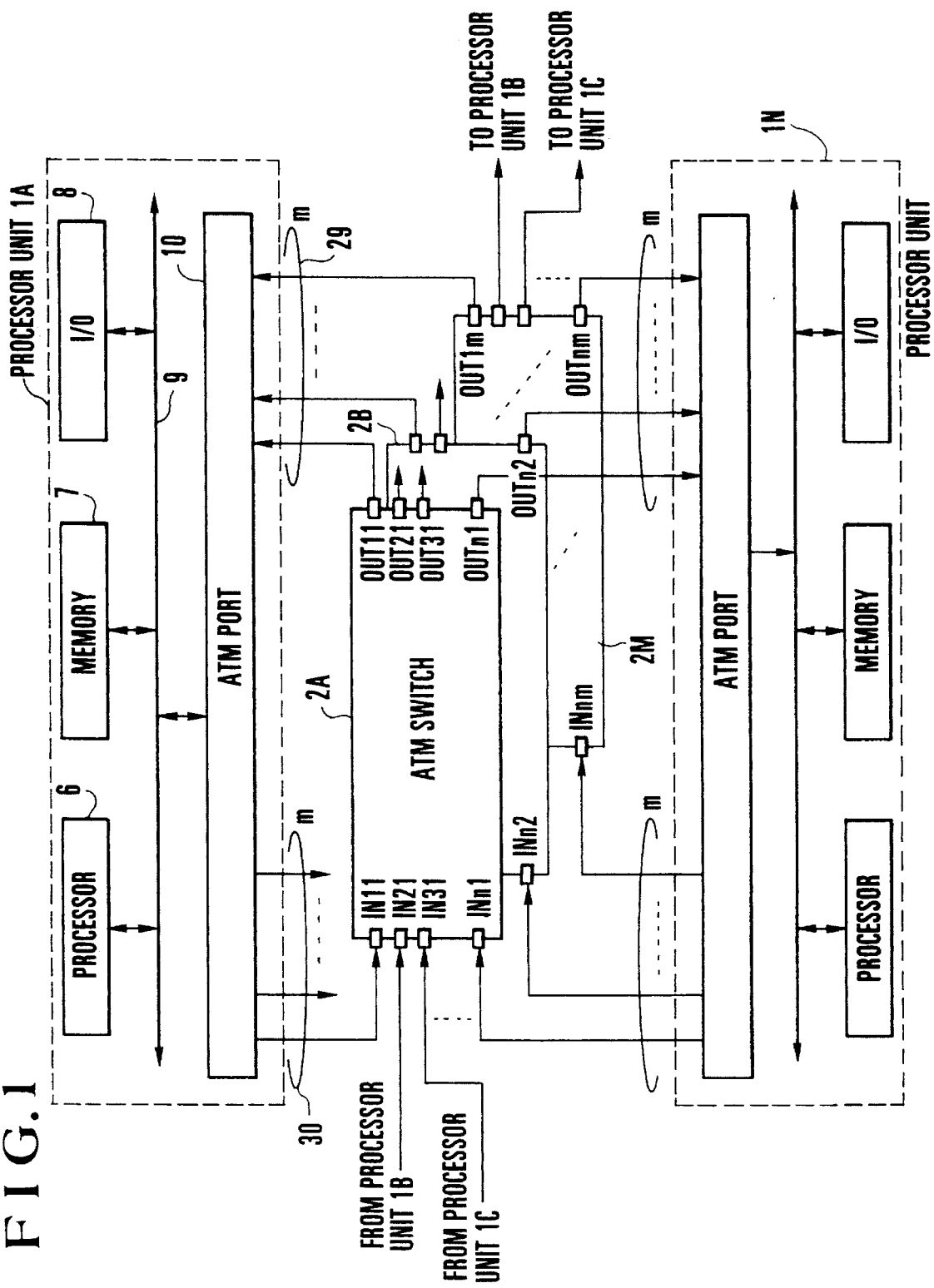
FIG. 1 is a block diagram showing an embodiment of a multiprocessor system of the present invention.

FIG. 1 is a diagram showing an embodiment of a multiprocessor system according to the present invention, in which n pieces of processor units 1 (1A to 1N) are connected to one another through m pieces of self-routing switches 2 (2A to 2M).

A "self-routing switch" mentioned in the present specification is understood to be a switch which fulfills the following conditions (1) or (2), and, for example, an ATM switch for switching fixed-length packets (hereinafter referred to cells) corresponds thereto.

(1) An input cell is routed to one of a plurality of output ports while selecting a route inside respective switches in accordance with routing information given at the front of the header of the input cell. The route is determined based on the information in each cell without receiving the switching instruction by a common control portion from the outside of the switch.

(2) A switch of high-speed self-routing type is controlled by hardware which handles a packet of comparatively short fixed length.

Each processor units 1 is composed of a processor 6, a memory 7, an I/O unit 8 and an ATM port 10 all of which are connected to one another by an internal bus 9 having a width of m bits.

The present invention is featured in that the internal bus 9 having a width of m bits of each processor is connected to a connection port for the ATM switch, i.e., the ATM port 10.

The ATM port 10 is provided with m pieces of input lines 29 and m pieces of output lines 30 corresponding to the bit width of the internal bus of each processor unit 1, respectively, and it is possible to transmit and receive data having an m bit width in a form of an ATM cell among these input lines and output lines. The input lines 29 and the output lines 30 of the ATM port 10 are connected to m ATM switches 2 (2A to 2M) each of which corresponds to a respective bit of the internal bus 9 in the processor unit, respectively.

ATM switches 2 are provided with n input terminals INlj to INnj (j=1 to m) and n output terminals OUTlj to OUTnj (j=1 to m), so as to be connected respectively to the n processor units 1A to 1N.

For example, the information positioned at the first bit position among output data having an m bit width of the first processor unit 1A is inputted to a first input terminal (INl1) of the first ATM switch (No. 1) 2A in a form of a subcell which is described later, and the information positioned at the nth bit position of output data of the first processor unit 1A is inputted to a first input terminal (INlm) of the nth ATM switch (No. m) 2M. Similarly, the information positioned at the first bit position of output data having an m bit width of the nth processor unit 1N is inputted to an nth input terminal (INnl) of the first ATM switch (No. 1) 2A, and the information positioned at the mth bit position of output data of the nth processor unit is inputted to an nth input terminal (INnm) of the mth ATM switch (No. m) 2M.

The information of a first output terminal OUTl1 of the first ATM switch 2A is inputted to the input line corresponding to the first bit position of the ATM port 10 of the first processor unit 1A, and the information of a first output terminal OUTlm of the mth ATM switch 2M is inputted to the input line corresponding to the mth bit position of the ATM port of the first processor unit 1A. Similarly, the information of an nth output terminal OUTnl of the first ATM switch (No. 1) 2A is inputted to the input line corresponding to the first bit position of the ATM port of the nth processor unit 1N, and the information of an mth output terminal OUTnm of the mth ATM switch (No. m) 2M is inputted to the input line corresponding to the mth bit position of the ATM port of the nth processor unit 1N.

On the other hand, a subcell including the information positioned at the first bit position of the data having an m bit width transmitted from respective processors is processed with switching in the first ATM switch (No. 1) 2A, and outputted to an output terminal OUTj1 to which a processor 2j which becomes the destination of the data is connected, and is sent to the input line corresponding to the first bit position of the ATM port of the destination processor 2j. Similarly, a subcell including information positioned at the mth bit position of the transmission data from respective processors is processed with switching in the mth ATM switch (No. m) 2M and outputted to an output terminal OUTjm to which the destination processor 2j is connected, and is sent to the input line corresponding to the mth bit position of the ATM port of the destination processor. In such a manner, respective processor units become possible to transmit/receive data at a high speed to and from another optional processor unit by transferring subcells in the number equal to the bit width m of the internal bus 9 in parallel through a plurality of ATM switches provided corresponding to the bits.

FIG. 2 is a block diagram showing the details of the ATM port 10 in FIG. 1.

The ATM port 10 performs such duties that m subcells formed by splitting a data stream (message) having an m bit width given from the processor 6 connected to the ATM port 10 through the internal bus 9 into a plurality of data blocks each having a predetermined length L, disassembling each data block into m sub-data blocks at every bit position and adding the same cell header to respective sub-data blocks are transmitted in parallel to the ATM switches 2A to 2M or, conversely, the subcells received from these ATM switches in parallel are converted into an original data stream form, which is delivered to the processor 6 through the internal bus.

The ATM port 10 is composed of a cell receiver 15 for receiving the subcells of the sub-data blocks (the first bit data block to the mth bit data block) corresponding to respective bit positions in parallel from the ATM switches 2A to 2M through m pieces of input lines 29, a header processor 16 for received cells for analyzing cell headers of a plurality of subcells supplied from the cell receiver 15 and converting subdata blocks extracted from respective subcells into data blocks each having a data width of m bits, a reassemble controller 17 for performing control operation for reassembling the data blocks supplied from the header processor 16 for received cells into a data stream form handled by the processor, a receiving buffer 18 for temporarily storing the reassembled data stream, a transmission buffer 21 for temporarily storing the data stream (message) to be sent to another buffer from the processor, an assemble controller 22 for reading a data block having a predetermined length L which becomes a transfer unit and performing control operation for converting the data block into m subcells, a header processor 20 for transmit cells for splitting the data block read out of the transmission buffer into m bit data blocks and adding transmission cell headers to respective bit data blocks, and a cell transmitter 19 for sending m pieces of subcells supplied from the header processor 20 for transmit cells in parallel to the ATM switches 2A to 2M through m pieces of output lines 30.

A reference numeral 23 represents a buffer management, 24 represents a DMA controller and 25 represents a port controller. A control bus 26, an address bus 27 and a data bus 28 are connected to the processor 6, the memory 7 and the I/O 8 in the processor unit shown in FIG. 1.

Figure 3A:
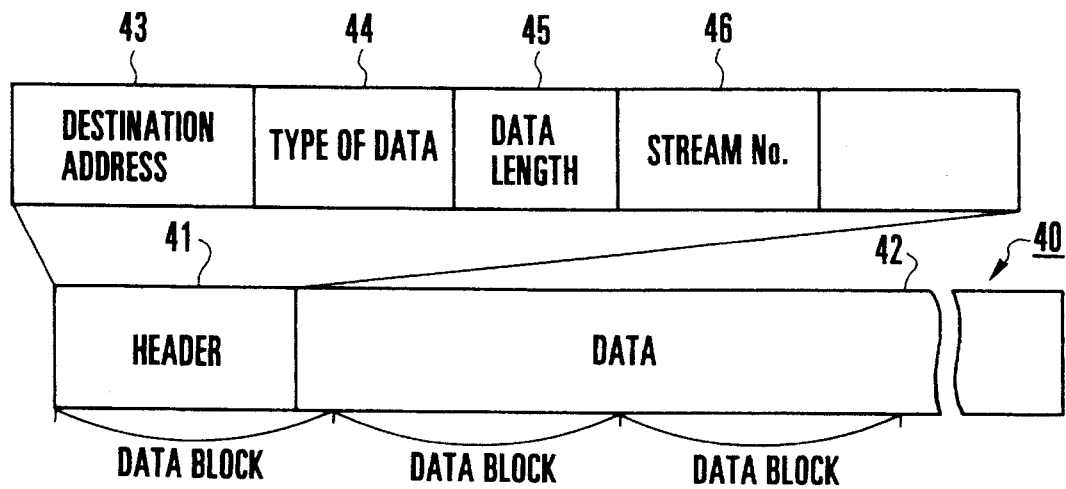
FIG. 3A is a diagram showing an example of a structure of a data stream transmitted from a processor.
Figure 3B:
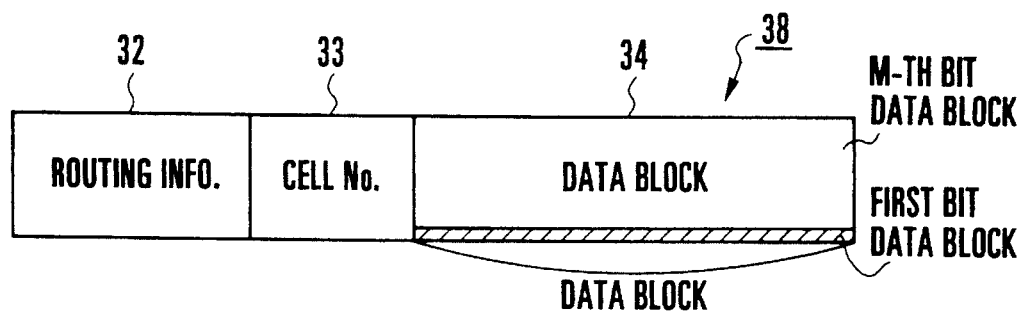
FIG. 3B is a diagram showing a structure of an ATM cell.
Figure 3C:
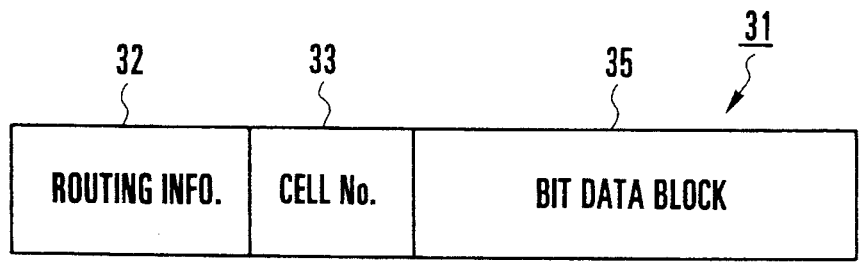
FIG. 3C is a diagram showing a structure of a subcell transmitted from an ATM port to an ATM switch.

FIG. 3A to FIG. 3C diagrammatically show an example of a data structure handled in the ATM port 10.

When data are transferred from the processor unit 1A to another processor unit such as 1N, transmission data are prepared in the memory 7 in a form of the data stream (message) 40 shown in FIG. 3A in the processor unit 1A.

The data stream 40 is composed of a header 41 and data 42. The header 41 is composed of a field 43 showing destination address, a field 44 showing type of data, a field 45 showing a data length and a field 46 showing data stream number (sequence number) of the data stream.

In the destination address field 43, the number of the processor unit which becomes a destination of the stream, and, as occasion demands, an identifier of a program handling the data 40 or a memory address for storing the data 40 are included.

In the ATM port 10, the data stream 40 received from the processor 1A is stored temporarily in the transmission buffer 21, and this data stream 40 is split into a plurality of data blocks each having a predetermined size L. The last data block is formed in a data block having a predetermined size L by adding a filler (such as a space) when the size is short of L.

In the ATM port, routing information (switch information) 32 required for the ATM switch for routing of the cell is generated in accordance with the contents of the destination address field 43 of the header 41 stored in the transmission buffer 21, and an ATM cell 38 is generated by adding the routing information 32 to the front of each data block 34 together with the cell number 33 as shown in FIG. 3B.

The present embodiment is featured in that the data block 34 having an m bit width in the ATM cell 38 is disassembled into the first bit data block composed of the first bits of respective bytes to the mth bit data block composed of the mth bits of respective bytes, m pieces of cells (hereinafter a cell including such a bit data block is referred to as a subcell in the present specification) 31 are formed by adding switch information 32 and the cell number 33 to each bit data block 35 as shown in FIG. 3C, and these subcells are outputted in parallel to the ATM switch 2 through the output lines 30.

Next, transmit-receive operation of data performed among processors will be described with reference to FIG. 2.

First of all, the data transmitting operation from one processor 1A to another optional processor such as 1N will be described.

The processor 1A informs the loading location of the data to be transmitted in the memory 7 of a port controller 25, and also generates a write command. The "write command" mentioned herein means transfer of data from the processor 1A to the processor 1N which becomes the destination of data through the ATM switch 2.

In response to the write command, the port controller 25 transfers the data stream 40 to be transmitted to the transmission buffer 21 from the designated data loading location of the memory 7 using the function of a DMA controller 24. Next, the port controller 25 instructs assembly operation to the assemble controller 22. In response to the instruction, the assemble controller 22 reads the transmission data block for the portion of a predetermined length L byte (m bits/byte) out of the transmission buffer 21. The transmission data block is split into m pieces of bit data blocks corresponding to bit positions, and a cell header is added to each bit data block in the header processor 20 for transmit cells.

Figure 4:
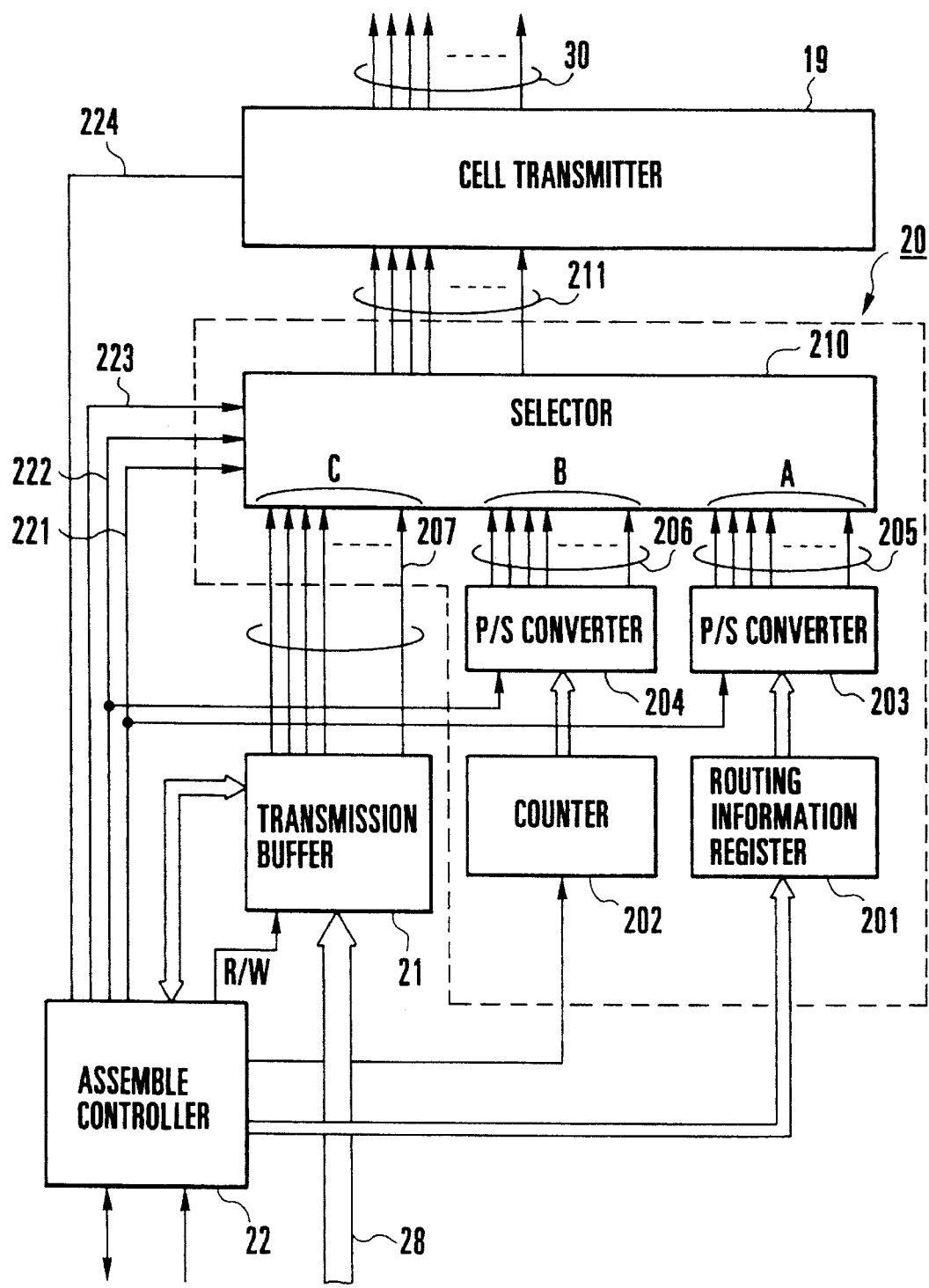
FIG. 4 is a diagram showing an example of a detailed structure of a header processor 20 for transmit cells.
Figure 5:
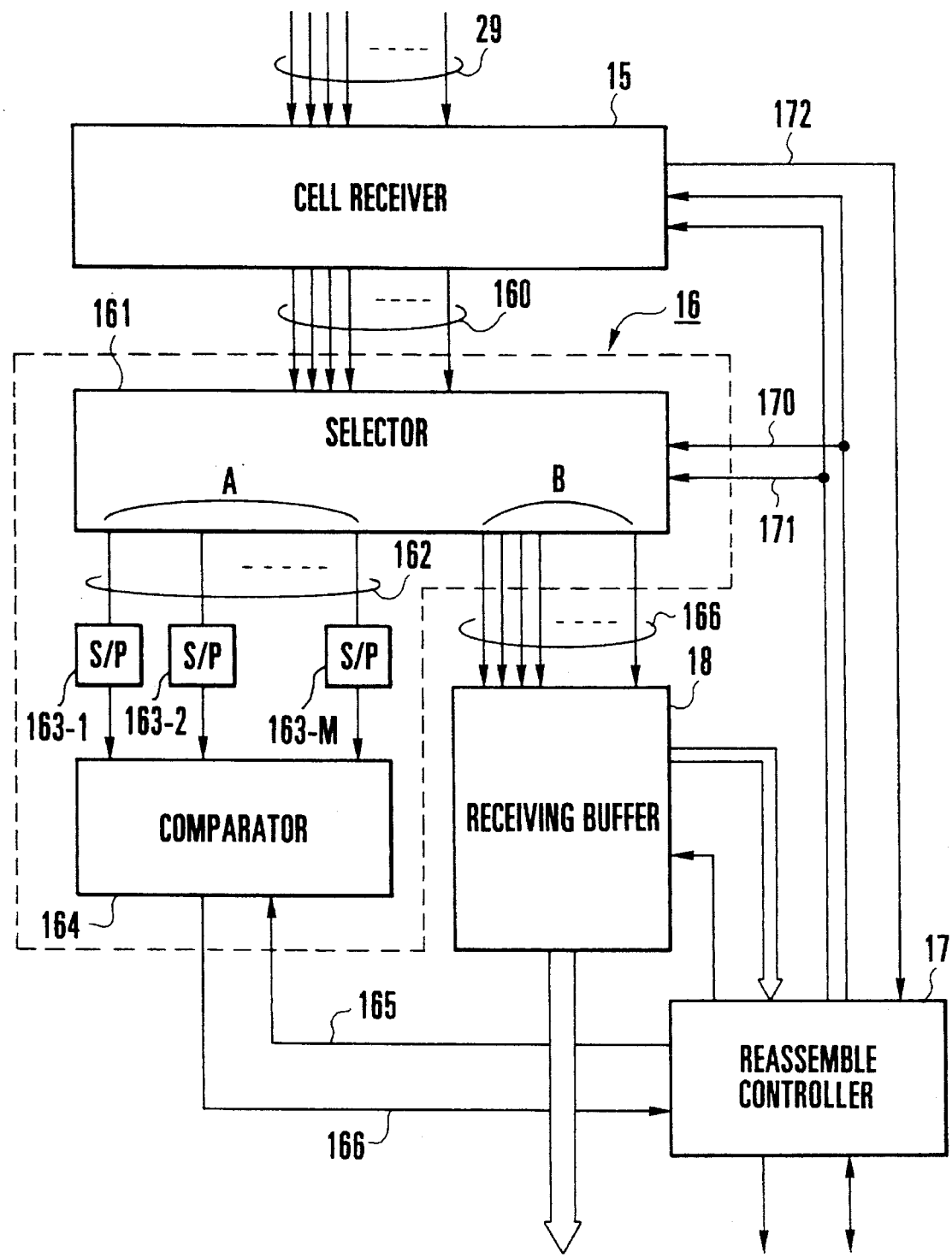
FIG. 5 is a diagram showing an example of a detailed structure of a header processor 16 for received cells.

FIG. 4 shows the details of the header processor 20 for transmit cells. The header processor 20 for transmit cells is composed of a routing information register 201 for setting routing information 32, an assemble counter 202 for counting the cell number 33, parallel/series converters (P/S converters) 203 and 204 for converting parallel data outputted from the routing information register 201 and the counter 202 into series data and a selector for selecting any of the outputs of the P/S converters 203 and 204 and the output of the transmission buffer 21 and outputting it to a cell transmitter 19 in accordance with a control signal given from the assemble controller through signal lines 221 to 223.

The assemble controller 22 generates the routing information 32 to be added to the subcells based on destination address information read out of the transmission buffer 21 when it receives an instruction to commence assembly operation from the port controller 25, and sets the routing information 32 to the routing information register 201. Further, the assemble controller 22 gives count instruction to the assemble counter 202 so as to generate a renewed cell number.

Next, the assemble controller 22 outputs a selection signal to the control signal line 221, thereby to operate the P/S converter 203 so as to convert routing information which is set in the register 201 into serial data and to output the serial data to m pieces of output lines 205, respectively. At this time, a selector 210 selects the input signal from the output line 205 of the P/S converter and is in an operating state to transfer the signal to a cell transmitter 19 through m pieces of signal lines 211. When transfer of the routing information is ended, the assemble controller 22 outputs a selection signal to the control signal line 222, operates the P/S converter 204, converts the count value of the counter 202 into serial data, and outputs the serial data to m pieces of output lines 206, respectively. At this time, the selector 210 selects an input signal from an output lines 206 of the P/S converter, and is in an operating state of transferring the signal to the cell transmitter 19 through the signal lines 211.

When transfer of the cell number is ended, the assemble controller 22 outputs a selection signal to the control signal line 223 and brings the selector 210 into the operating state of transferring the signal inputted from output lines 207 of the transmission buffer 21 to the cell transmitter 19 through the signal lines 211. The assemble controller 22 reads data blocks each having a length L successively from the transmission buffer 21 in this state. Those data blocks are read to the output lines 207 as m pieces of bit data blocks split by bit positions, and supplied to the cell transmitter 19 through the signal lines 211.

In the cell transmitter 19, m pieces of serial data supplied from the selector 210 through m pieces of signal lines 211 are stored once, for example, in m pieces of subcell queue memories prepared corresponding to output lines 30, and the contents of these queue memories are outputted to the output lines 30 in response to the transmission instruction given from the assemble controller 22 through the control signal line 224. Besides, sending of subcells to the output lines 30 may be operated in such a manner that, after header information (routing information and cell numbers) is stored in the queue memories, the subcell information is outputted from the queue memories in parallel with the inputs of the bit data blocks to these queue memories.

By repeating the above-described operation, the data streams in the transmission buffer 21 are all formed into subcells, and, when the subcells are transmitted to the ATM switches 2A to 2M completely, the assemble controller 22 notifies the port controller 25 of end of transmission through the buffer management 23. The port controller 25 applies interruption to the processor 1A using the control bus 26 when notice of end of transmission is received from the assemble controller 22, thereby to notify of end of transmission. Besides, exchanges of various commands are also made between the processor 1A and the ATM port 10 as described later.

Next, the operation of receiving data from another processor in the processor 1A will be described.

Respective outputs from the ATM switch 2A to the ATM switch 2M shown in FIG. 1 appear as a signal having an m bit width on the whole, which is inputted to the cell receiver 15 in the ATM port shown in FIG. 2.

The cell receiver 15 receives m pieces of subcell signals in parallel from the ATM switches 2A to 2M through the input lines 29, and delivers these subcell signals to the header processor 16 for received cells.

The header processor 16 for received cells has a selector 161 for receiving m pieces of subcell signals in parallel from a cell receiver 15 through signal lines 160, and the selector 161 outputs these subcell signals to an output port A or an output port B selectively in accordance with a control signal given from a reassemble controller 17 through a control signal line 170 or 171.

M pieces of signal lines 162 having S/P converters 163-1 to 163-m for converting serial data into parallel data in m bits, respectively, are connected to the output port A, and the outputs of these S/P converters are inputted to a comparator 164. Further, a receiving buffer 18 is connected to the output port B through m pieces of signal lines 166.

A reassemble controller 17 outputs first a control signal for header processing to the control signal line 170 in response to a control signal outputted to a control signal line 172 by the cell receiver when m pieces of subcells are received by receiving queues (not illustrated) of the cell receiver 15. In response to this control signal, the contents of headers (routing information 32 and cell numbers 33) of the received m pieces of subcells are supplied to the selector 161 from the cell receiver 15, and transferred to the output port A in the selector. These contents are converted into parallel data by the S/P converters 163-1 to 163-m, and inputted to the comparator 164 thereafter. The comparator 164 compares these m pieces of headers with one another in response to the control signal outputted to a control signal line 165 by the reassemble controller 17, and outputs a signal which indicates the result of determination whether these headers coincide with one another or not to a signal line 166.

The reassemble controller 17 sends a control signal indicative of a data reception error to the port controller 25 when the result of determination indicates that discord is produced among cell headers, and outputs a control signal for data block processing to the control signal line 171 when the result of determination indicates coincidence of all cell headers. In response to this control signal, the contents of the bit data blocks of received m pieces of subcells are supplied to the selector 161 from the cell receiver 15, and they are transferred to the output port B and inputted to the receiving buffer 18 through the signal lines 166.

Every time a subcell is received, a data stream is restored in the receiving buffer 18 by repeating the operation of the header processor 16 for received cells and the reassemble controller 17. The reassemble controller 17 determines the number of data blocks to be received and processed from a value of the data length field 45 included in the header of the data stream stored in the receiving buffer. Then, the reassemble controller 17 receives the last data block and notifies the port controller 25 of the end or termination of data reception when the original data stream is completed in the receiving buffer 18.

The port controller 25 instructs DMA transfer of the data stream to a DMA controller 24 when notified of the end of data reception, and the data stream is transferred to the data receiving area of the memory 7. When the transference is ended, the port controller 25 applies interruption of end of reception to the processor.

Figure 6:
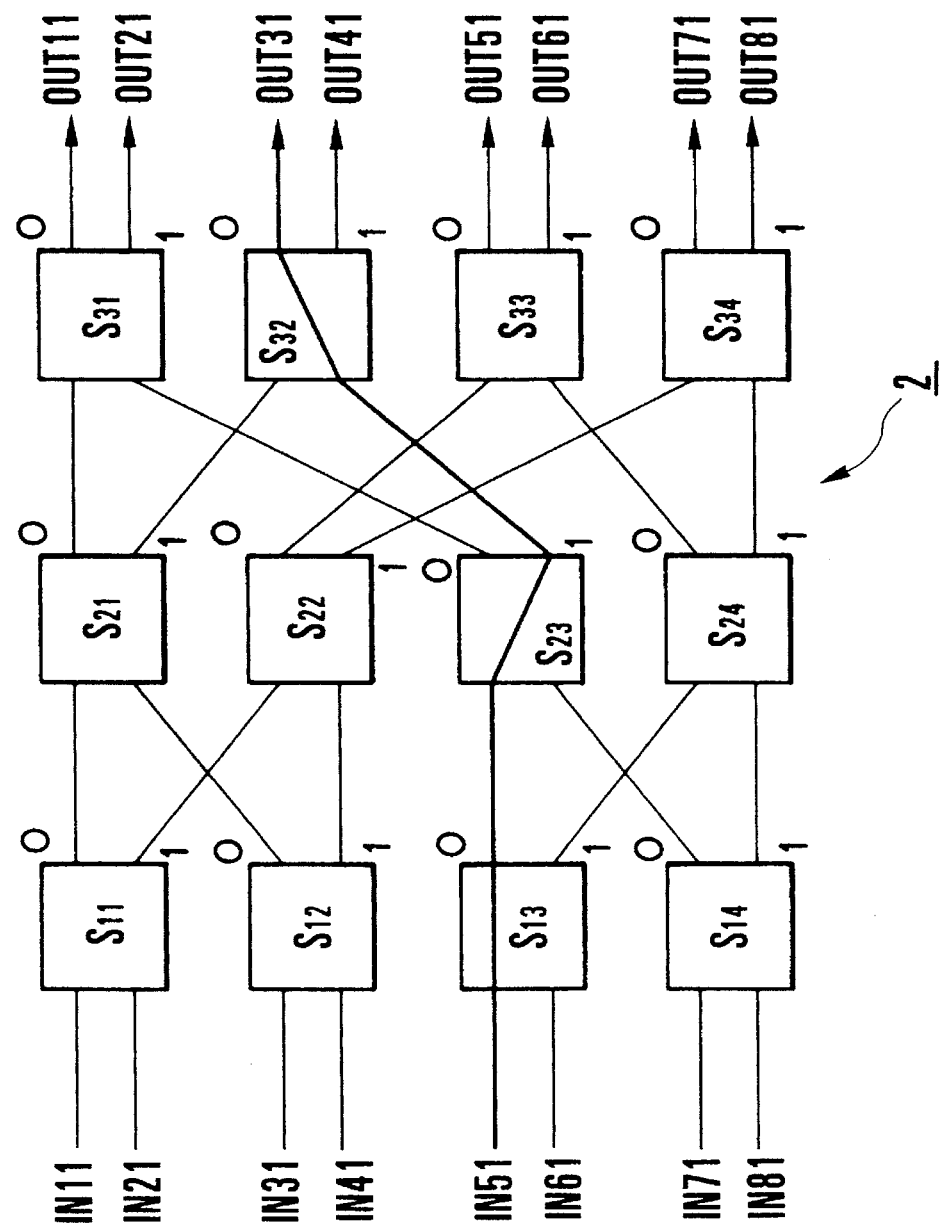
FIG. 6 is a diagram showing an example of a detailed structure of an ATM switch 2 shown in FIG. 1.

FIG. 6 is a diagram showing an example of the structure of the ATM switches 2 (2A to 2M).

The duties of the ATM switches 2 are to process with switching the subcell 31 inputted from optional input terminal INij (i=1 to n, j=1 to m) to output to one of output terminals at a high speed based on the routing information (switch information) 32. The ATM switch is formed to have a switch structure by connecting a plurality of unit switches S11 to S34 at a plurality of stages.

In the illustrated example, each of respective ATM switches 2 is composed of 12 pieces in total of unit switches S11 to S34 arranged in 4 lines and 3 stages, and each unit switch has two input terminals and two output terminals. In the switches S11 to S14 at the first stage, an outgoing route of the received subcell is determined in accordance with the state of the first bit of the routing information of a subcell received from respective input terminals, and the subcell is outputted to one of output terminals. The unit switches S21 to S24 at the next stage determine the output terminal through which the cell is to be outputted in accordance with the state of the second bit of the routing information of the received subcell. Similarly, in the unit switch at the nth stage, the output destination is determined by watching the nth bit of the routing information of the subcell which is sent in. Besides, such a series of operations inside the unit switch are performed at a high speed of gate delay degree by means of a hardware circuit.

The operation of the ATM switch shown in FIG. 6 will be described taking the processing with switching of a subcell which is sent out of a processor unit 1C having an identifier "3" from a processor unit 1E having an identifier "5" for instance as an example.

In the routing information field 32 of each cell sent out of the ATM port of the processor 1E, the routing information corresponding to the identifier of the destination processor unit 1C is set with a binary value "010".

In the example shown in FIG. 6, the ATM switch 2A for processing with switching the subcell corresponding to the first bit is shown. The subcell from the processor unit 2 is inputted to the unit switch S11 from an input signal line INS1. Since the state of the first bit of the switch information of the input subcell is "0" in the unit switch S11, the subcell is sent to a unit switch S23 at the second stage connected to the output terminal side displayed with "0".

Since the state of the second bit of the switch information of the input subcell is "1" in the unit switch S23, the subcell is sent to a switch S32 at the third stage connected to the output terminal side displayed with "1".

Since the state of the third bit of the switch information of the input subcell is "0" in the unit switch S32, the subcell is sent to an output signal line OUT31 connected to the output terminal side displayed with "0".

The processor unit 1C is connected to the output signal line OUT31. The operation similar to the above is also performed in the ATM switch 2B for processing with switching a subcell including the data block of the second bit to the ATM switch 2M for processing with switching a subcell including the data block of the mth bit. As a result, the data sent to the processor unit 1C from the processor unit 1E are split into a plurality of subcells corresponding to bit positions and reach to the destination processor 1C through the plurality of ATM switches 2A to 2M arranged in parallel.

In this case, since respective ATM switches can transfer a plurality of subcells having different transmitting origins simultaneously, the problem of access contention or conflict in a conventional bus coupling system is not generated.

Besides, the structure of the ATM switch and the connection configuration of unit switches shown herein show only one concrete example for determining a destination of a cell based on the contents of routing information so as to realize a switch-processing function of the cells by means of hardware, and the present invention does not prevent application of a switch having another configuration.

Figure 7:
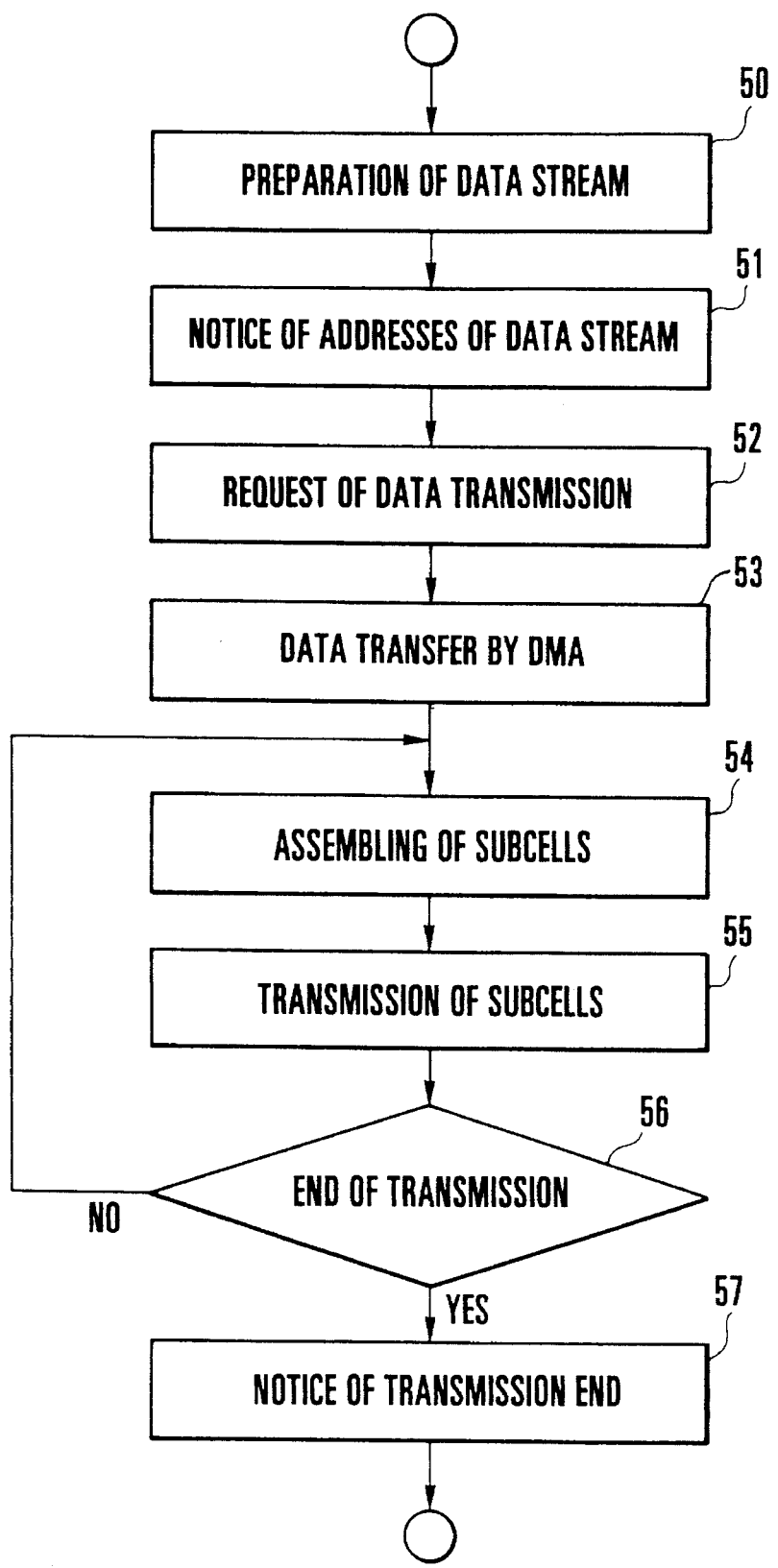
FIG. 7 is a flow chart showing steps of procedure that one processor transmits data to another processor in a system shown in FIG. 1.

FIG. 7 is a flow chart showing steps of procedure of transmitting operation of a cell performed by the processor 6 and the ATM port 10.

The processor 6 prepares the data stream 40 having header information including the addresses of the processor at a destination of transmission (step 50), and instructs a start address and an end address in the memory of the data stream 40 to be transmitted to the ATM port 10 (step 51). Then, it sends request of data transmission to the ATM port 10 (step 52).

The controller 25 of the ATM 10 has the DMA controller 24 transfer the data stream 40 from the previously designated memory 7 to the transmission buffer 21 (step 53). When data transfer from the memory 7 to the transmission buffer is terminated, the data stream is split into data blocks each having a cell size, a subcell at each bit data block is formed in the header processor 20 for transmit cells and supplied to the cell transmitter 19 (step 54). Next, after transmission of cells is instructed to the cell transmitter 19 (step 55), it is checked whether all of the data streams in the transmission buffer 21 have been transmitted completely or not (step 56). In case there are remaining data, the process is returned to the step 54 and formation of subcell transmission and operation of transmission are repeated, and in case all of the data streams have been transmitted, end of transmission of the data streams is informed to the processor (step 57).

In the above-mentioned embodiment, the processor gives request of data transmission to the ATM port after writing the data stream 40 composed of the transmission data 42 and the header 41 in the memory, but a part of generation processing of the header 41 may be performed in the ATM port.

Figure 8:
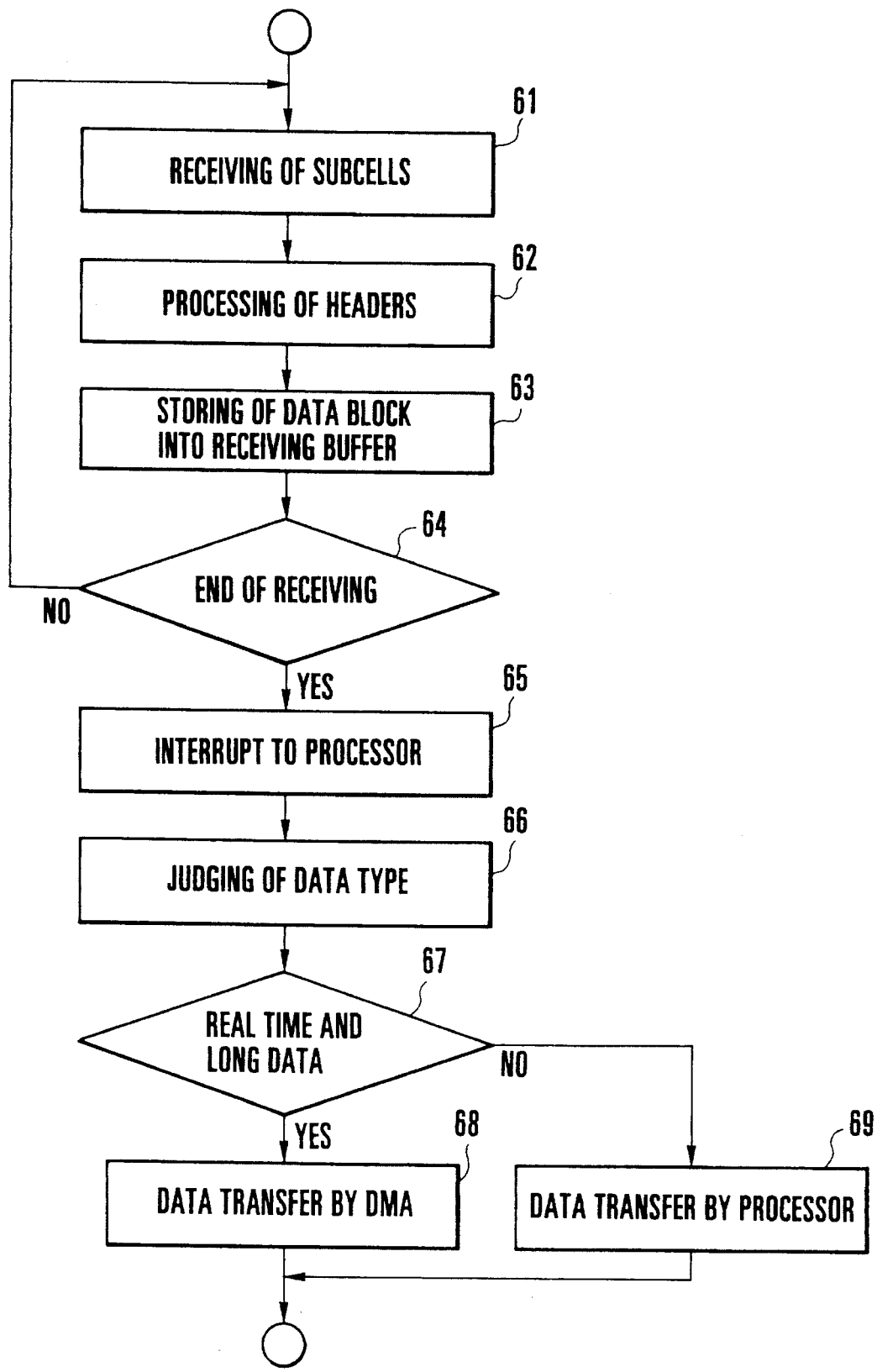
FIG. 8 is a flow chart showing steps of procedure that one processor receives data from another processor in the system shown in FIG. 1.

FIG. 8 is a flow chart showing steps of procedure of receiving operation of a cell performed in the ATM port 10 and the processor 6.

When the subcells from the ATM switch 2 are received by the cell receiver 15 (step 61), the ATM port 10 performs header analysis and header removal processing of the cells which have arrived at the header processor 16 for received cells (step 62), and thereafter, stores received data blocks in the buffer area in the receiving buffer 18 designated by the buffer management 23 (step 63). It is checked whether all of the cells constituting one data stream have arrived or not (step 64), the process is returned to the step 61 if there is a cell to be received, and the arrival of a next cell is waited for.

When reception of all the cells is completed, interruption for notifying of the end of reception is applied to the processor (step 65). The processor confirms the received data type when it receives the interruption (step 66). When the type of received data is a real time stream and the data length is longer than a prescribed value (step 67), data are transferred to the memory 7 from the receiving buffer 18 using a DMA function (step 68), and the processor 6 transfers data to the memory 7 from the receiving buffer 18 otherwise (step 69).

Besides, the prescribed value of the data length which becomes a criterion to decide whether DMA transfer is to be made or not is determined in advance at the stage of system design.

As to transmission and reception of data among a plurality of processors, memory-to-memory is a fundamental rule. According to the system configuration of the present invention, respective processors transfer data after confirming:

(1) whether the buffer of the objective processor has been secured, and (2) whether preparation for reception has been completed, when communication is started since the communication bus through the ATM switch with respect to another optional processor has already been set when the system is started.

Figure 9:
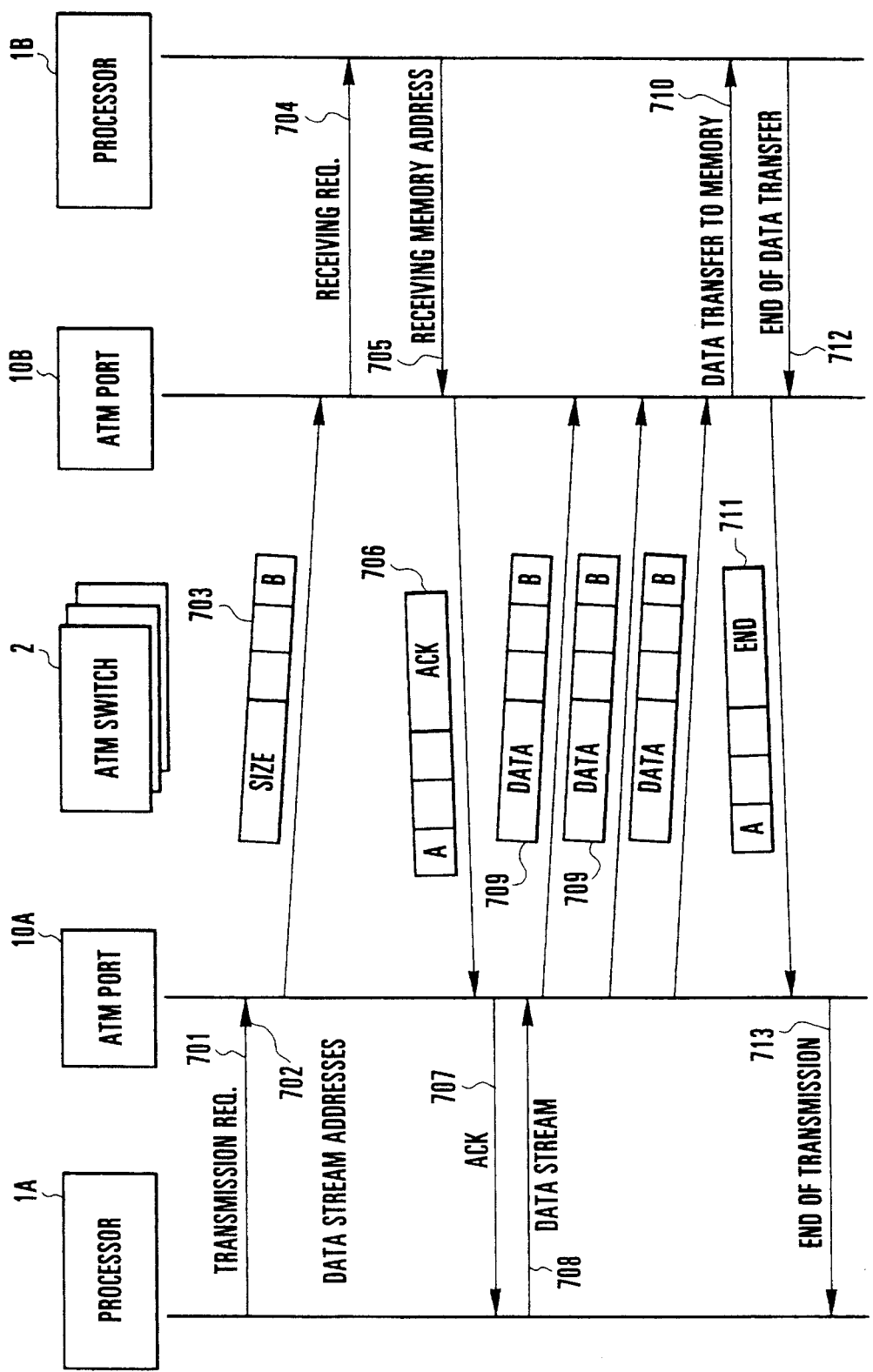
FIG. 9 is a diagram showing another embodiment of transfer steps of procedure of data among processors in the system shown in FIG. 1.

FIG. 9 shows an example of data transfer steps of procedure between two processors.

The processor 1A gives transmission request to the ATM port 10A (step 701), and notifies the ATM port of data stream addresses to be transmitted in the memory 7 (step 702).

The ATM port 10A analyzes the header of the data stream 40, and notifies the destination processor of the memory size required for data reception and the control cell including a transmission request command through the ATM switch 2 (step 703).

An ATM port 10B of the destination processor 1B which has received the transmission request command cell shows memory capacity required for reception and puts forward a receiving request to the processor 1B (step 704).

The processor 1B instructs a memory area for storing received data to the ATM port 10B (step 705). Upon receipt of this instruction, the ATM port 10B sends a control cell including an acknowledgement command to the ATM port 10A through the ATM switch 2 (step 706).

The ATM port 10A notifies the processor 1A of acknowledgement when a control cell from the ATM port 10B is received (step 707).

The processor 1A transfers a data stream to be transmitted to the ATM port 10A in response to the notice of the acknowledgement (step 708).

The ATM port 10A transfers the data stream to be transmitted to the destination ATM port 10B in a configuration of the ATM cell 31 obtained by splitting the data stream into a plurality of bit data blocks (step 709).

The ATM port 10B receives the ATM cells successively, and instructs the processor 1B to transfer the received data stream to the receiving memory when all of the ATM cells constituting one data stream are received completely (step 710), and sends a control cell showing the end of reception to the ATM port 10A (step 711).

When transfer of the received data stream to the receiving memory is ended, the processor 1B notifies the ATM port 10B of the end of transfer, and release the buffer in the ATM port (step 712).

The ATM port 10A which has received the control cell indicating the end of reception notifies the processor 1A of the end of data transmitting operation (step 713).

When some communication steps of procedure are performed among processors for securing a receiving memory area and so on for instance prior to data transfer in case real time data are transferred among processors, the time delay for that portion degrades the real time nature of the data.

According to the system of the present invention, it is possible to omit all or a part of communication steps of procedure among processors before commencement of data transfer by that respective processors secure receiving memory areas exclusively for real time data in advance and register the positions in the receiving memory area in the ATM port.

The size of a stream in the data of real time nature is generally short in order to make delay as shortest as possible. Therefore, a plurality of areas determined taking the traffic volume into consideration in advance are prepared for the memory area for receiving real time data.

Since the data of a real time system are pressed for time for resending the data even when missing of data or erroneous reception happens, it is possible to omit a part of confirmation procedures among ATM ports during the period of data transfer.

Accordingly, as shown in FIG. 10 for instance when the processor 1A puts forward transmission request for a data stream including a code indicating that they are real time data to a data type field 44 (step 802), the ATM port 10A splits the transmission data stream into a plurality of blocks immediately forms subcells by dividing each block into a plurality of bit cell blocks, and sends the subcells 31 to the destinations shown in the data stream one after another (step 803).

In the ATM port 10B, positional information of the receiving memory is registered in advance by means of the processor 1B (step 801). Therefore, when the ATM port 10B receives the subcells 31 and recognizes that these are real time data from the data type field, it continues receiving operation as is, and, when the data for one data stream portion are received completely, the ATM port 10B transfers the data stored temporarily in the receiving buffer to the receiving memory (step 804).

The ATM port 10A notifies the processor 1A of the end of transmission when transmission of one data stream is ended (step 805). On the other hand, when processing of the data in the receiving memory which are transferred from the receiving buffer is ended and the receiving memory area shows a space state, the processor 1B on the data receiving side registers it as a space area for the ATM port 10B so that this receiving memory may be reutilized (step 806).

FIG. 11 shows an example in which the data transfer structure of the present invention is applied to a multi-media work station having functions of processing, storage and communication of different types of data such as voice, data and image.

In such a multi-media work station, a multiprocessor configuration is adopted, in which processing, communication, storage and so on with respect to voice and image are performed by dividing processing, communication, storage or the like with respect to voice and image among respective exclusive processors prepared separately from the processors for performing general data processing in order to perform complicated information processing at a high speed. In this case, since only one processor can use the bus at a time even if a plurality of processors are going to communicate with the other processors in the structure that these plurality of processors are connected mutually by buses, the other processors have to wait for the turn. When queuing is generated in processing in the case of real time information such as voice and image, isochronism becomes no longer be warrantable. Further, there has been such a problem that the high speed by structuring with exclusive processors cannot obtain desired results because of low speed communication among processors.

The multi-media work station shown in FIG. 11 is structured by connecting a plurality of processors constituting the work station such as a communication processor 80 connected to a wide area network 90, a filing processor 81 functioning as a file server, an image input processor 82 connected to an image input device such as a camera, an image processor 83 for image processing, an image display processor 84 for displaying images of the multi-media in a plurality of windows of the display screen, an audio input processor 85 for processing audio information inputted from a microphone, an audio processor 86 for performing editing, processing or the like of audio information and an audio output processor 87 for outputting audio information to a speaker by means of a group 88 of the ATM switches.

The header 41 of the data stream sent to other processors by respective processors may be of the format shown in FIG. 3A, but a format including a field 48 for setting control information for controlling cell transfer in the wide area network with priority or time information for controlling reproducing operation may be adopted in the header 41 as shown in FIG. 12. With this, it becomes possible to perform transfer operation of the receiving data from the wide area network to the filing processor 81 by the communication processor 80, transfer operation of the image data from the image input processor 82 to the image processor 83, transfer operation of the result of processing in the image processor 83 to the image display processor 84, transfer operation of the audio data from the audio input processor 85 to the audio processor 86, and transfer operation of the result of processing in the audio processor 86 to the audio output processor 87 in parallel at the same time using the same data stream format.

FIG. 13 shows an example of a system configuration in which processors are connected one another by means of the ATM switches provided with input-output terminals larger in number than the processors to be connected mutually.

In this example, m pieces of input lines 29 and m pieces of output lines 30 of the ATM port are divided into q pieces of groups each including p pieces, respectively, and p pieces of input lines and output lines of respective groups are connected to p pieces of input terminals and output terminals of the same ATM switch, respectively, thus making it possible to transfer data among processors by means of a small number (q pieces) of ATM switches.

Figure 14:
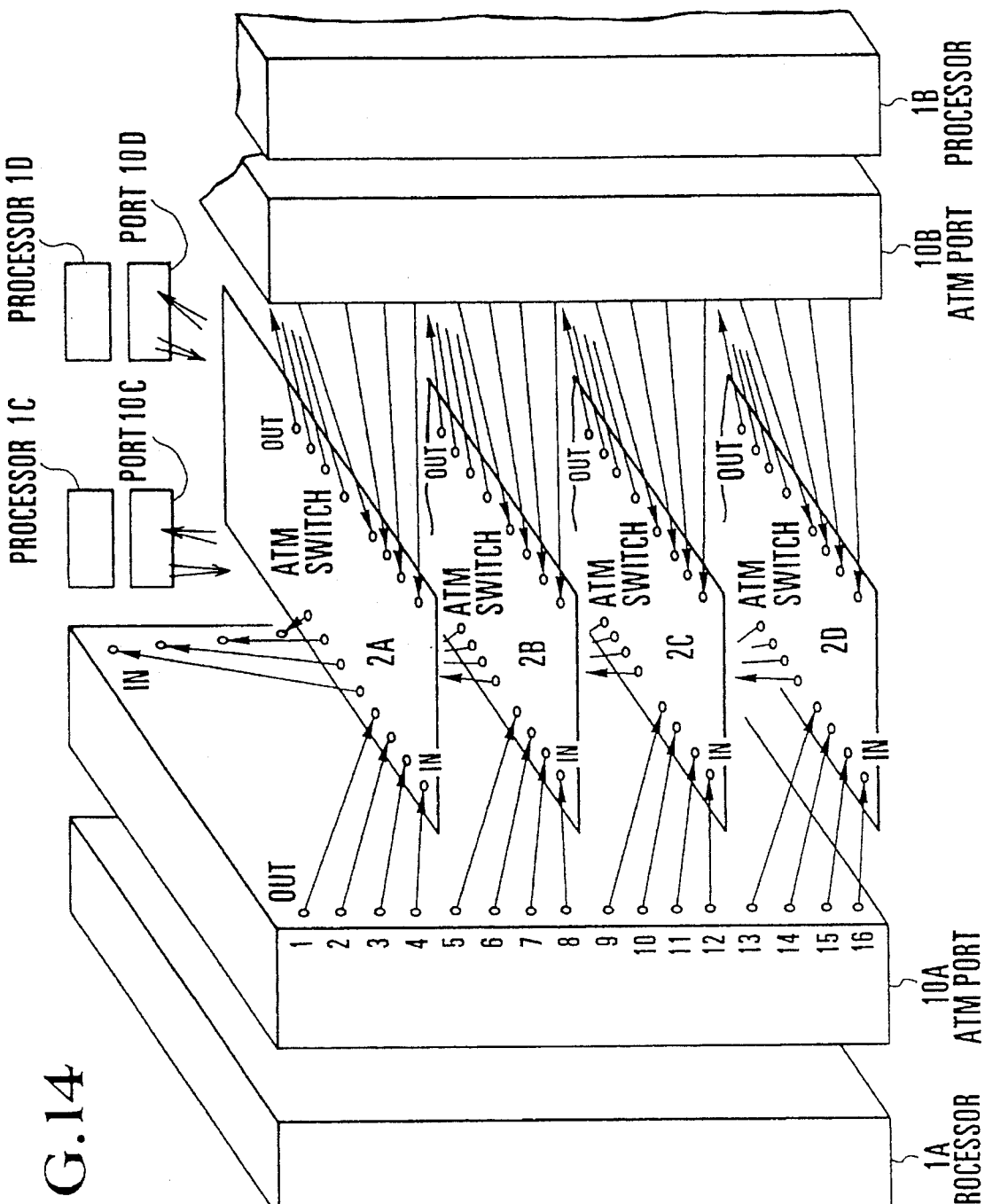
FIG. 14 is a perspective view showing a connection structure among ATM ports and ATM switches in FIG. 13.

When the bus width is in m bits, and each ATM switch has input-output terminals in the number equal to integer times S of the number of processors, m/S pieces of ATM switches are required. For example, 4 stages are sufficient for ATM switches 2 when 4 bits each per one processor are connected to one ATM switch 2 in a processor having a bus 16 bits wide as shown in FIG. 14. Namely, it becomes possible to connect 4 pieces of processors in parallel at the same time by setting the input number and the output number of each ATM switch to 16 pieces, respectively, and connecting the first to the 4th bits of the buses of respective processors 1A to 1D to the ATM switch 2A, the 5th to the 8th bits to the ATM switch 2B, the 9th to the 12th bits to the ATM switch 2C, and the 13th to the 16th bits to the ATM switch 2D.

In this case, in order to output a plurality of subcells of the same group inputted in parallel to one switch to a plurality of output terminals constituting one group connected to the destination processors in parallel, p pieces of subcells belonging to the same group are required to have routing information different from one another at lower bits.

In case p=4 for instance, setting of the routing information can be realized, for example, by a structure in which p pieces of P/S converters 203 are prepared in FIG. 4, and means for adding inherent bit information "00" "01" "10" and "11" to lower bits of the routing information given from the routing information register 201 is provided in each P/S converter.

In the structure described above, when the number of processors connected to the input terminals and the output terminals provided on one switch is remarkably small as compared with the number of these terminals, all the processors are connected mutually with only one piece of switch, and communication among respective processors can be achieved by parallel transfer of a plurality of cells.

According to the present invention, respective processor units can be connected to any other processor unit keeping the bus width of the processor unit as it is. Respective channels among processors are independent in the switch, thus making it possible to perform transfer operation among respective processors without waiting for the end of other transfer operation in parallel at the same time.

Accordingly, it becomes possible to transfer mutually among respective processors in a computer without degrading the real time feature and isochronism which are peculiar to multi-media information.

What is claimed is:

1. A multiprocessor system in which a plurality of processors are connected to one another, each of said processors including an internal bus of M-bit width where M is a positive integer, said multiprocessor system comprising:

M self-routing switches, each for transferring a cell received from one of a plurality of input terminals to one of a plurality of output terminals determined by header information of said cell; and interface means for interfacing between internal buses to which said respective processors are connected and said M self-routing switches, said interface means comprising:

first means for splitting a data stream received from one of said processors and composed of a plurality of bytes to be transmitted to another processor into a plurality of data blocks, converting each data block into M cells, each of said M cells having a header which is different depending on a destination processor and a partial data block which forms a portion of said data block, and sending said M cells in parallel to said M self-routing switches, and second means for receiving M cells in parallel from said M self-routing switches and converting partial data blocks included in said M cells into one data block.

2. A multiprocessor system according to claim 1, wherein said first means and said second means are connected to each of said M self-routing switches.

3. A multiprocessor system according to claim 1, wherein said M self-routing switches are equal in number to a number of bits in one byte of said transmission data; and said first means splits said data block into a plurality of bit data blocks corresponding to bit positions, forms each of said M cells using one of said bit data blocks, and sends respective ones of said M cells to said M self-routing switches based on bit positions of respective bytes of said transmission data.

4. A multiprocessor system in which a plurality of processors are connected to one another, each of said processors including an internal bus of M-bit width where M is a positive integer, said multiprocessor system comprising:

M self-routing switches, each transferring a cell received from one of a plurality of input terminals to one of a plurality of output terminals determined by header information of said cell; and interface means for interfacing between internal buses to which said respective processors are connected and said M self-routing switches; said interface means comprising:

a first group of signal lines provided for each processor for connecting said interface means to M input terminals of said M self-routing switches, a second group of signal lines provided for each processor for connecting said interface means to M output terminals of said M self-routing switches, means for splitting a data stream received from one of said processors to be transmitted to another processor into a plurality of data blocks each having a predetermined length, converting each data block into M cells, each cell having a header which is different depending on a destination processor, and sending said M cells in parallel to said first group of signal lines of said one of said processors, and means for receiving M cells in parallel through said second group of signal lines from said another processor and converting M bit data blocks included in said M cells into one data block.

5. A multiprocessor system according to claim 4, wherein said first and second signal line groups are connected to input terminals and output terminals peculiar to said processor of said respective self-routing switches, respectively.

6. A method of communication between a plurality of processors connected to one another through M self-routing switches, each of said processors including an internal bus of M-bit width where M indicates a positive integer and in which respective processors are connected to M input lines and M output lines of said M self-routing switches, said method comprising the steps of:

splitting a data block composed of a plurality of bytes to be transmitted into M bit data blocks to be transmitted from a first processor which becomes an origin of transmission data to a second processor which becomes a destination of said transmission data;

forming M cells by adding headers including routing information peculiar to said second processor to each of said plurality of bit data blocks by means of said first processor;

transmitting, from said first processor, said M cells in parallel to M input lines connecting said first processor and said M self-routing switches with each;

transferring, by said M self-routing switches, said M cells in parallel to M output lines connecting said second processor and said M self-routing switches with each other; and receiving, in said second processor, M cells in parallel from said M output lines and reassembling M bit data blocks included in the received M cells into one data block.

7. A method of communication according to claim 6, wherein each of said M self-routing switches has a plurality of input terminals and a plurality of output terminals, and respective ones of said processors are connected to respective ones of said switches through at least a pair of lines including of an input line and an output line; and said first processor sends said M cells to respective switches specified by the bit positions of said M bit data blocks.

* * * * *